Jan. 20, 1931.  L. AZARRAGA  1,789,289
CAMERA
Filed May 22, 1928  2 Sheets-Sheet 1

INVENTOR
LUIS AZARRAGA.
BY
ATTORNEY

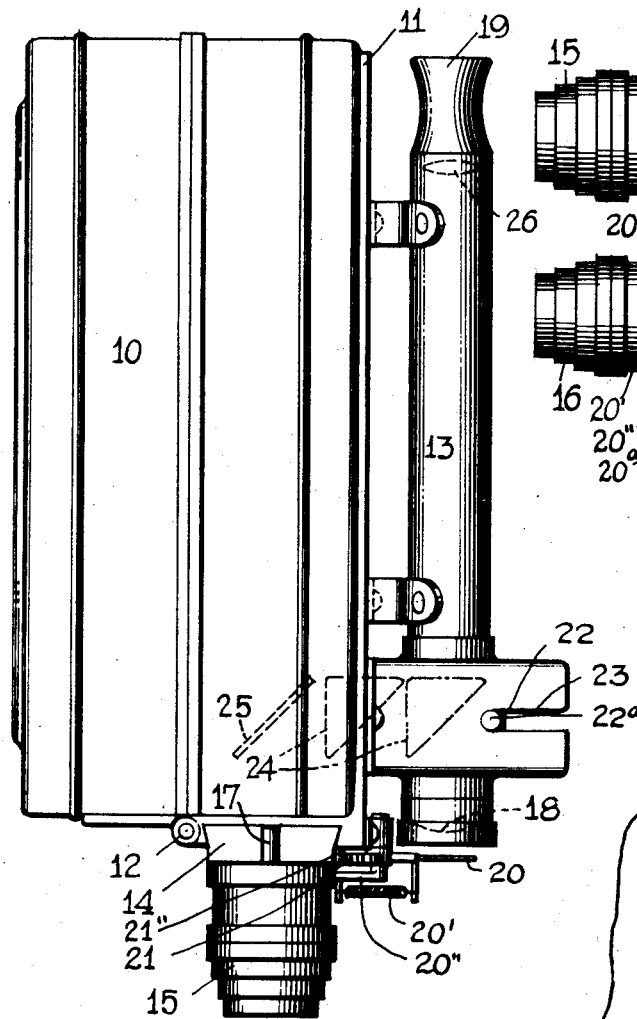
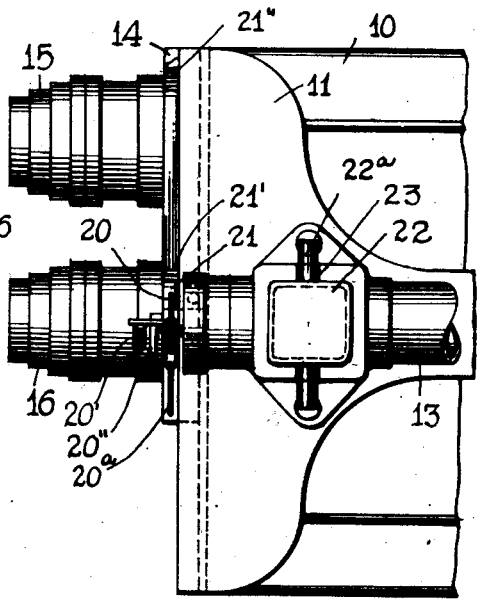
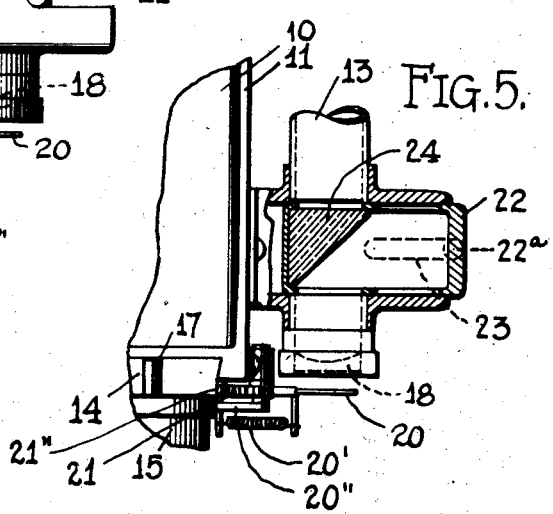

Patented Jan. 20, 1931

1,789,289

UNITED STATES PATENT OFFICE

LUIS AZARRAGA, OF HEMPSTEAD, NEW YORK

CAMERA

Application filed May 22, 1928. Serial No. 279,675.

My invention relates to camera view finders and lens changing mounts, and more particularly to their adaptation to motion picture cameras.

An object of the invention is to provide a rapid selective means for changing from a lens of one focal length to that of another focal length as individual requirements of the moment may demand.

A further object of the invention is to co-relate the field of vision in the view finder with the particular lens selected so that the view finder automatically registers the field that will be covered by whatever lens is in use.

A further object of the invention is to enable the operator to use the same spy view for finding and locating the subject properly in the field of the lens, and for focusing on it, thru the film, thus enabling a more rapid and convenient set-up on a given object to be photographed.

A still further object of the invention is to permit the operator to see and focus on the object thru the camera lens itself by means of the spy view finder so that the exact lens field is brought into view, thus eliminating the error due to the axis of the spy view finder being displaced from the axis of the camera lens; an element of importance in the proper centering of "close-ups".

Other and further objects of the invention will be hereinafter pointed out.

In the drawings, wherein like reference characters denote like or corresponding parts.

Fig. 3 is a top view of the camera showing the mounting of the spy view finder and indicating the location of the integral film focusing mechanism or finder when out of focusing position;

Fig. 4 is a partial side view of the camera showing the sliding lens mount and a portion of the side view finder, and Fig. 5 is a sectional view taken thru the focusing view finder, and illustrating the mechanism of the film focusing arrangement in film focusing position.

In the embodiment of the invention selected for illustration a standard DeVry type of motion picture camera is shown as so equipped. It is not intended, however, that the invention shall be limited to this particular type of camera, nor to motion picture cameras, nor shall it be limited to the specific mechanical example set forth, but shall be understood to be a preferred arrangement for the purpose of this description.

Figure 1:
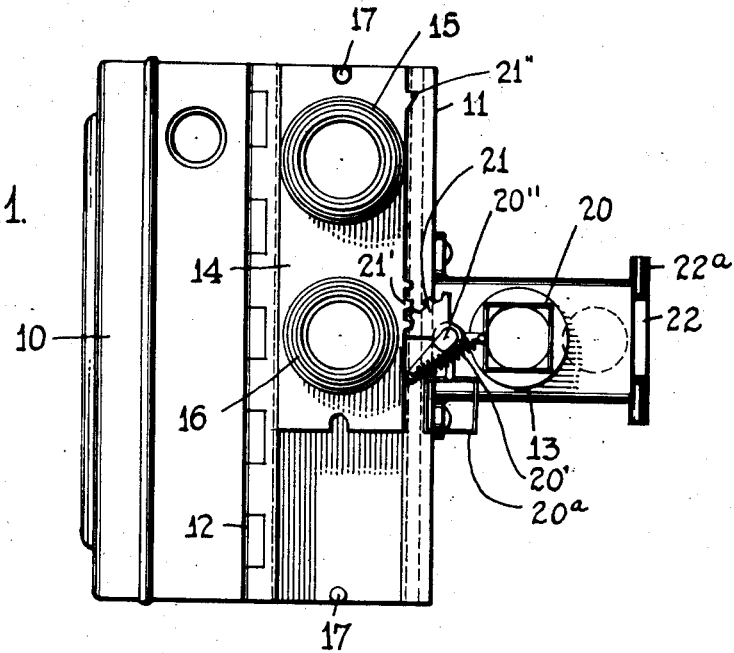
Fig. 1 is a front view of the invention as applied to a motion picture camera, showing the lenses and co-related view masks in a given position.
Figure 2:
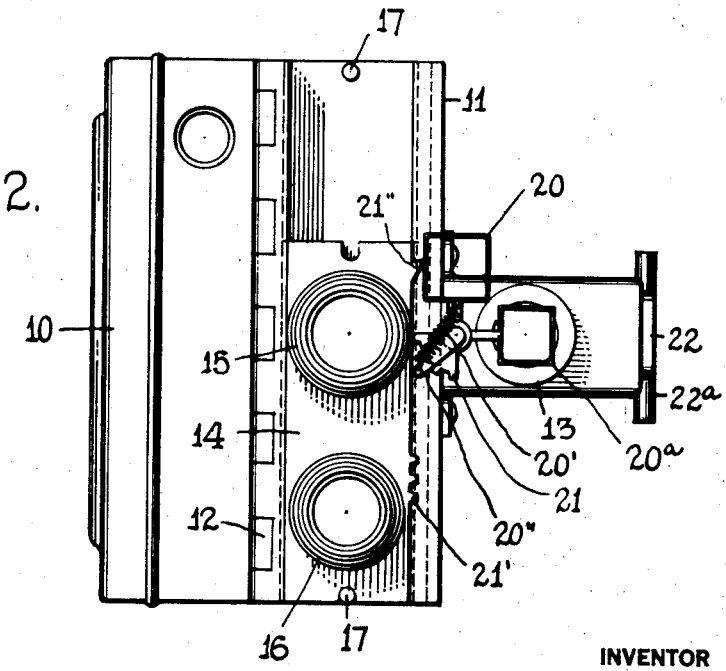
Fig. 2 is a front view showing the position of the sliding lens mount and co-related view masks when shifted to a different lens position.

Referring first to Fig. 1, 10 designates the camera in its entirety. A grooved base plate 11 is hinged to the front of the camera by a hinge 12 extending the full height of the camera front so that the base plate may be swung clear of the camera for the purpose of examining the mechanism underneath. The base plate extends around one side of the camera (see Figs. 3 and 4) and serves as a base for the attachment of the combination spy view and focusing finder 13. Slidably mounted in the grooved base plate 11 is the lens mount 14 holding two lenses 15 and 16 of any desired focal length, altho the scope of the invention does not limit it to this number. The sliding lens mount 14 may be moved vertically in the grooved base plate 11 to position either the lens 15 or the lens 16 in front of the film gate (not shown) of the camera. Fig. 1 illustrates lens 16 so positioned, and Fig. 2 illustrates the lens mount shifted so as to bring lens 15 in front of the gate, the proper location being assured by stops 17 provided at the opposite ends of the groove.

The spy view finder 13, it will be noted, is located directly alongside of the lens positioned in front of the film gate. It is so constructed that by means of a lens and ground glass 18 (see Fig. 5) or a plain finder glass, the operator, when looking thru the eye piece 19 will see the widest field capable of being covered by any lens carried by the lens mount 14, as will readily be understood by those skilled in the art.

Mounted for rotation on the base plate 11 is a set of masks 20, 20ᵃ, etc. The masks 20 and 20ᵃ are light frames of metal or wire of a substantially square shape. Each of the frames may be, if desired, provided with a transparent element such as glass through which the field to be photographed may be viewed, though such an element is unnecessary. As shown, the mask 20 is considerably larger than the mask 20ᵃ and is designed to cooperate with the lens 16. The smaller mask 20ᵃ is designed to cooperate with the lens 15. The sizes of the respective masks are so arranged that the field which may be viewed through either of them is coincident with the field which is projected upon the film through the corresponding lenses 15 or 16. It is, of course, to be understood that though the lens 16 appears smaller yet it is intended to illustrate a lens for photographing a larger field than the field which may be photographed by the lens 15. Preferably said masks extend radially out from said axis of rotation and are of such proportion that when placed in front of the spy view finder 13 they define the field covered by their corresponding specific lens on the lens mount 14. Mechanism including a gear segment 21, a rack 21′ and a cam surface 21″ is provided and so constructed that as the lens mount 14 is shifted to bring a specific lens in front of the film gate, the corresponding mask 20 is snapped in front of the spy view finder 13 to thus automatically define the field covered by said lens. A spring 20′ fastened at one end to a forward projection attached to one or the other of the masks 20, 20ᵃ, etc., and is attached at its opposite end to the outer end of a fixed arm 20″. This spring acts as a snapover spring and serves as a yielding means for holding the masks 20, 20ᵃ, etc. in proper position. In the illustration the spring is shown attached to a projection on the mask 20. The cam surface 21 mentioned above is designed when in the position shown in Fig. 2 to contact with the edge of the frame or mask 20 and hold it in such a position that the mask 20ᵃ is exactly centered over the lens 18.

The focusing finder 22 is normally in the inoperative position with the projecting pin or operating handle 22ᵃ pushed into slot 23 as shown in Fig. 3. This clears the reflecting prism 24 (see Fig. 3) from the spy view finder 13 so that the latter may be used as hereinabove set forth. When the focusing finder 22 is pulled out as shown in Figs. 1, 2 and 5, the image created on the film in the film gate by means of the lens 15 or 16, as the case may be, is reflected thru a right-angle by the mirror 25 and is in turn reflected by prism 24 upon the rear lens 26 of the spy view finder so that the operator may focus thru the film (not shown) by sighting thru the eye piece 19. The focusing finder 22 is returned to the position as shown in Fig. 3 when ready to take a picture.

It is obvious from the foregoing that lenses of a variety of focal lengths may be carried on the lens mount 14 and that by moving the sliding mount in the grooved base plate 11 the operator can readily position whatever or whichever lens is required under the then existing circumstances. This makes it possible to select the proper focal length lens for a given "shot" with great rapidity.

The automatic co-relation of the masks 20, with their corresponding lenses, gives an instantaneous and correct indication of the field being registered on the film by any lense as soon as it is positioned for use in front of the film gate. This effectively eliminates the possibility of not completely covering the subject, or of losing the subject by the use of the wrong lens, and marks a distinct advance over the inaccurate methods hitherto employed.

The incorporation of the focusing finder 22 in the spy view finder enables rapid set ups on a given subject. The choice of proper lens can be made instantly and the camera centered. Without removing the eye from the eye piece, the proper focus can be obtained by pulling out the focusing finder 22 to the position indicated in Fig. 1 and the focus made thru the film by means of the reflecting mirror 25 and prism 24.

Focusing finder 22 may also be used as a means of accurately locating the camera for extreme "close-ups" where displacement of the spy view finder 13 from the main lens axis would give a displaced field thru the masks 20.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a camera, a sliding lens mount, and lenses of different focal length carried by and movable with said lens mount.

2. In a camera, a movable lens mount, lenses of different focal length carried by and movable with said lens mount, and a guideway along which and within which said lens mount is respectively moved and held.

3. In a camera, a guideway extending across one face thereof, a lens mount movable along said guideway, lenses of different focal length carried by and movable with said lens mount, and means for holding said lens mount with one or the other of said lenses in operative position.

4. In a camera, a guideway extending across one face thereof, a lens mount slidable along said guideway, lenses of different focal length carried by and movable with said lens mount, and stops at opposite ends of said guideway for holding said lens mount with one or the other of said lenses in operative position.

5. In a camera, the combination, of a view finder positioned at one side thereof, an adjustable lens mount carried by the camera, lenses of different focal length carried by and movable with said lens mount, a given size mask for each said lens, and means for positioning one or the other of said masks in operative relation with said view finder by and as its co-related lens is brought into operative position.

6. In a camera, the combination, of a view finder positioned at one side thereof, an adjustable lens mount carried by the camera, lenses of different focal length carried by and movable with said lens mount, a given size mask for each said lens, and means for positioning one or the other of said masks in operative relation with said view finder by and as a result of the movement of said lens mount.

7. In a camera, the combination, of a view finder positioned at one side thereof, an adjustable lens mount carried by the camera, lenses of different focal length carried by and movable with said lens mount, a given size mask for each said lens, said masks being radially arranged and having a common axis of rotation, and means for rotating said masks to position one or the other thereof in operative relation with the view finder by and as a result of the movement of said lens mount.

8. In a camera, a lens, a spy view finder positioned at one side of said lens, and means comprising a prism slidable into and out of operative position for focusing on the object to be photographed thru said lens with the aid of the spy view finder.

9. In a camera, a plurality of lenses of different characteristics included therein, means for moving any selected one of the lenses into operative position, a view finder positioned at one side of the camera and means responsive to movement of the lenses for limiting the field of the view finder to the field transmitted through the selected lens.

In testimony whereof I hereunto affix my signature.

LUIS AZARRAGA.